United States Patent [19]

Chen

[11] Patent Number: 5,302,940
[45] Date of Patent: Apr. 12, 1994

[54] MOTOR VEHICLE BRAKE DETECTOR

[76] Inventor: Chi-Shan Chen, No. 15, Alley 18, Lane 42, Chung-Nan Street, Nan-Kang District, Taipei, Taiwan

[21] Appl. No.: 956,266

[22] Filed: Oct. 5, 1992

[51] Int. Cl.$^5$ .............................. B60Q 1/00
[52] U.S. Cl. ................... 340/454; 340/449; 200/61.4; 128/1.11
[58] Field of Search ............. 340/454, 453, 449; 200/61.4; 188/1.11

[56] References Cited

U.S. PATENT DOCUMENTS

| | | | |
|---|---|---|---|
| 3,674,114 | 7/1972 | Howard | 340/454 |
| 4,298,857 | 11/1981 | Robins et al. | 340/454 |
| 4,562,421 | 12/1985 | Duffy | 340/454 |
| 4,649,370 | 3/1987 | Thomason | 340/453 |
| 4,824,260 | 4/1989 | Novotny | 340/453 |
| 5,079,947 | 1/1992 | Feldmann et al. | 340/453 |

Primary Examiner—John K. Peng
Assistant Examiner—Nina Tong

[57] ABSTRACT

A motor vehicle brake detector is fastened in the brake shoe of a motor vehicle brake assembly and connected to a warning control circuit including a thermo resistor on the instrument board of the motor vehicle to give warning signals in terms of light intensity of an indicator lamp of the warning control circuit as the brake assembly was overheated during a brake or the brake shoe of the brake assembly was damaged to increase temperature of the thermo resistor and decrease the resistance of the thermo resistor, thereby increasing the light intensity of the indicator lamp for warning purpose.

1 Claim, 2 Drawing Sheets

MOTOR VEHICLE BRAKE DETECTOR

BACKGROUND OF THE INVENTION

The present invention relates to a motor vehicle brake detector which gives warning signals as the brake assembly of a motor vehicle was overheated during a brake or the brake shoe of the brake assembly was damaged.

Various brake systems are shown and used in motor vehicles for stopping movement in an emergency. These brake systems are normally operative. Because a much heat is suddenly released from each brake assembly of a motor vehicle brake system and the respective wheel hub during a brake, the heat must be quickly dissipated within a short length of time so that a high coefficient of friction can be maintained for permitting each brake assembly to work properly. Furthermore, if the brake shoe of a brake assembly is damaged or worn off, the brake force of the brake assembly becomes greatly reduced. It is very dangerous to keep using a damaged brake assembly.

SUMMARY OF THE INVENTION

The present invention has been accomplished under the aforesaid circumstances. It is therefore the main object of the present invention to provide a motor vehicle brake detector which automatically monitors the condition of a brake assembly of the brake system of a motor vehicle, and which automatically gives warning signals to the driver of the motor vehicle as the brake assembly was overheated during a brake or the brake shoe of the brake assembly was damaged. According to the preferred embodiment, the motor vehicle brake detector comprises a thermo sensor received in a metal sleeve packed by an insulator and fastened inside a blind hole on the brake shoe of a motor vehicle brake assembly with two opposite ends thereof respectively connected to the two opposite ends of a warning control circuit. The warning control circuit turns on LED indicators as the brake assembly was overheated during a brake or said brake shoe of the brake assembly was damaged.

DETAILED DESCRIPTION OF THE PREFERRED EMBODIMENT

Figure 1:
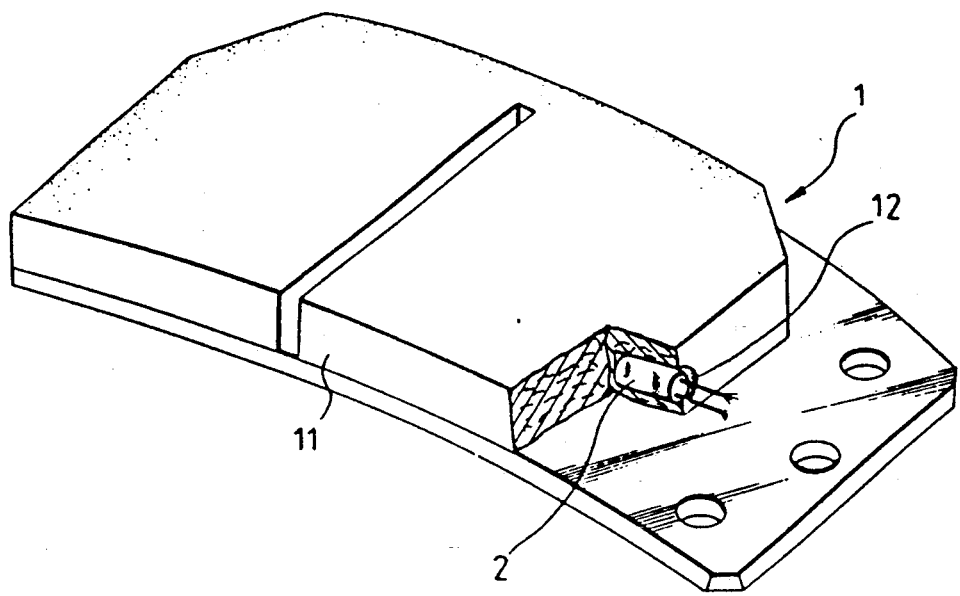
FIG. 1 is a perspective and partly sectional view of the preferred embodiment of the present invention.
Figure 2:
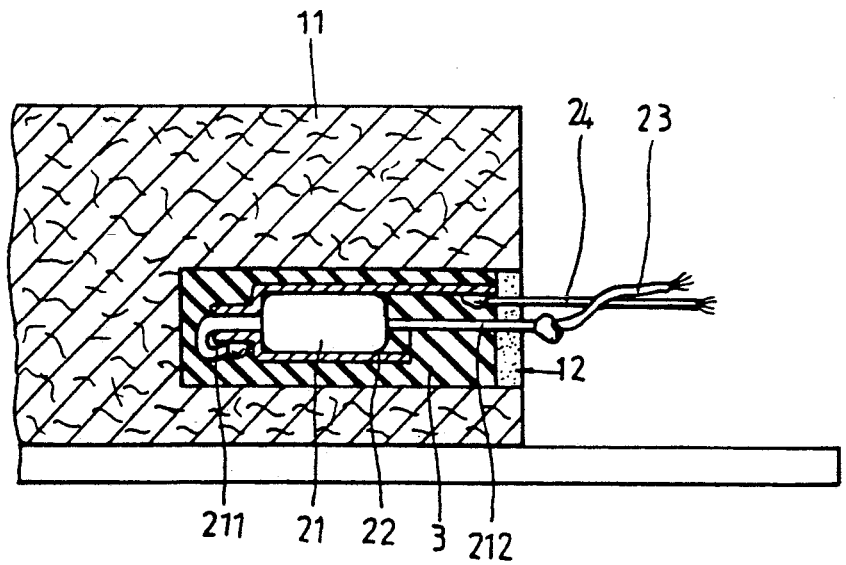
FIG. 2 is a cross section showing a sensor received in a metal sleeve packed by an insulator inside a blind hole on the brake shoe of a brake assembly.

Referring to FIGS. 1 and 2, the present invention is generally comprised of a brake assembly 1, a sensor 2, an insulator 3, and a warning control circuit 4. The brake shoe 11 of the brake assembly 1 has a blind hole 12. The thickness from the peripheral wall of the blind hole 12 to the outside surface of the brake shoe 11 is within the safety range for permitting the brake shoe 11 to normally perform the function of braking. The sensor 2 is comprised of a metal sleeve 22 connected with a conductor 24, and a thermo resistor 21 received inside the metal sleeve 22 and having an output terminal 211 extended out of and welded to the metal sleeve 22 and an input terminal 212 connected with a conductor 23.

Figure 3:
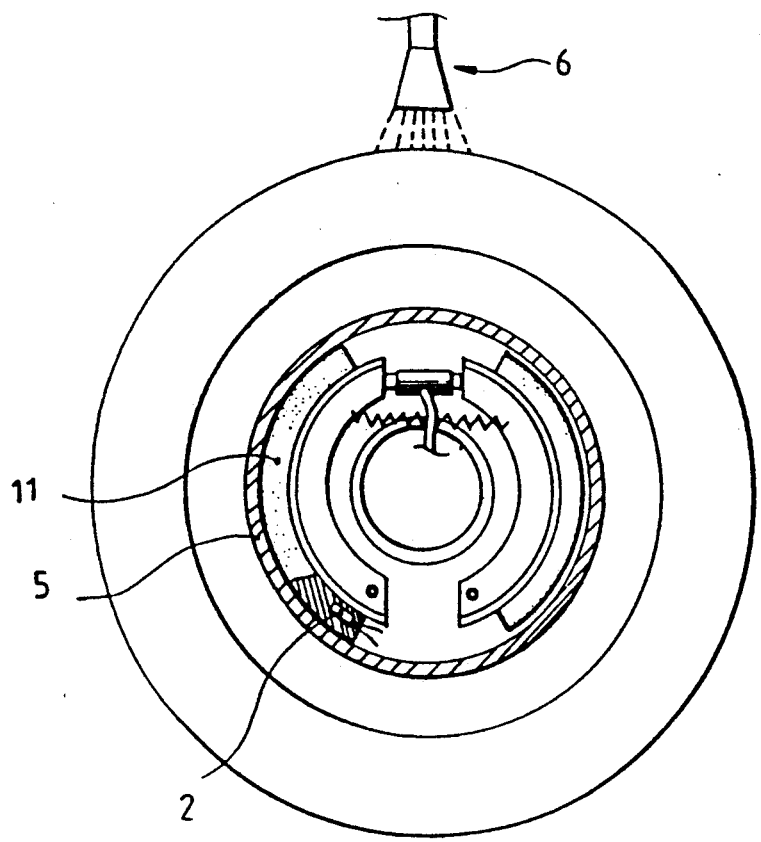
FIG. 3 is a plan view showing an installed example according to the present invention.

Referring to FIG. 3 and FIG. 2 again, the sensor 2 is packed by an insulator 3 inside the blind hole 12, and then the brake assembly 1 is installed in the brake system of a motor vehicle. During each brake, the heat which is produced because of the rubbing of the brake assembly 1 against the respective wheel hub or disk brake 5 is transmitted through the insulator 3 to the thermo resistor 21 of the sensor 2, causing the thermo resistor 21 electrically connected, and therefore a signal is sent through the conductor 23 to the output terminal 211 via the input terminal 212 and then sent to the warning control circuit 4 via the metal sleeve 22 and the conductor 24. Upon receipt of the signal from the sensor 2, the warning control circuit 4 gives a warning signal to the driver in warning the driver of a high temperature. As the thickness of the brake shoe 11 becomes below the safety range and the insulator 3 was worn off, the metal sleeve 22 will contact the wheel hub or disk brake 5 upon each brake, causing a zero resistance to occur, and therefore the warning control circuit 4 gives a warning signal to the driver, informing the driver of the damage of the brake assembly 1.

Figure 4:
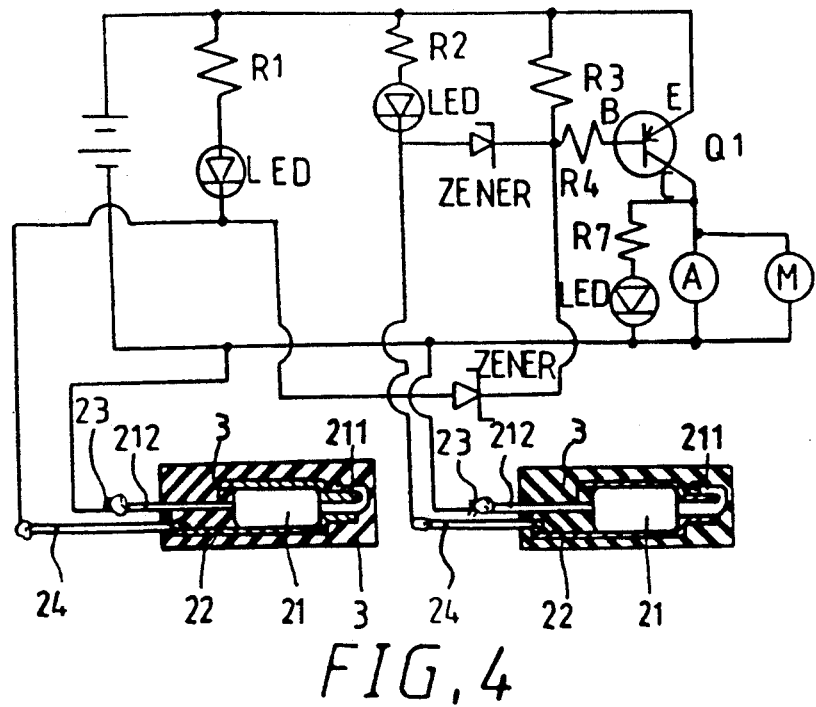
FIG. 4 is a warning control circuit diagram according to the present invention.

Referring to FIG. 4, the warning control circuit 4 is an application of ordinary techniques. It uses a zener diode to control a transistor Q1. The higher the voltage of the zener diode, the longer the transistor Q1 connected or disconnected (for example: if a 7.5 V zener diode is used, the voltage to connect the two opposite ends of the thermo resistor should be below 4.9 V). The operational principle is to connect one end of a resistor R1 to earth and the opposite end of the resistor R1 to the positive terminal of the LED then to the thermo resistor 21 through a series connection, and to connect a zener diode between the LED and the thermo resistor 21. As the positive voltage at the LED passes through the thermo resistor 21, either end of the thermo resistor 21 has a voltage. Therefore, the intensity of light of the LED is directional proportional to the negative voltage at the thermo resistor 21. As the temperature was so increased to electrically connect the zener diode, the transistor Q1 triggers an alarm A in turning on an indicator lamp LED. At the same time, the two opposite ends of the alarm A, namely, the transistor Q1 may be connected to an electromagnetic valve M to control the brake system in increasing the hydraulic oil pressure or the braking distance. Alternatively, the electromagnetic valve M may be used to control a water sprayer to cool down the brake assembly. According to the aforesaid operational principle, several sets of LEDs, thermo resistors and zener diodes may be arranged in parallel and connected to the instrument board of a motor vehicle for monitoring all brake assemblies of the motor vehicle. Furthermore, an automatic water sprayer 6 may be controlled by the warning control circuit 4 to spray water in cooling down the brake assemblies and the wheel hubs or disk brakes as the brake assemblies and the wheel hubs or disk brakes were overheated.

What is claimed is:

1. A motor vehicle brake detector comprising a blind hole formed in a brake shoe of a motor vehicle brake assembly, a thermo sensor packed by an insulator fastened inside said blind hole and connected to a warning control circuit for permitting said warning control circuit to give warning signals as said brake assembly was overheated during a brake or said brake shoe of said brake assembly was worn off;

said thermo sensor including a metal sleeve connected to one end of said warning control circuit by a first conductor, and a thermo resistor received inside said metal sleeve and having an output terminal extended outwardly and welded to said metal sleeve and an input terminal connected to an opposite end of said warning control circuit by a second conductor; and said warning control circuit including an indicator lamp electrically connected with said thermo resistor in series in between said first and said second conductors of said thermo resistor, whereby upon increasing of temperature of said brake assembly, said thermo resistor will decrease its resistance and increase its negative voltage to thereby increase a light intensity of said indicator lamp for warning purpose.

* * * * *